US008626949B2

(12) United States Patent
Agarwal et al.

(10) Patent No.: US 8,626,949 B2
(45) Date of Patent: Jan. 7, 2014

(54) INTELLIGENT NETWORK ADDRESS LOOKUP SERVICE

(75) Inventors: Sharad Agarwal, Seattle, WA (US);
Najam Ahmad, Redmond, WA (US);
Behrooz Chitsaz, Bellevue, WA (US);
Manuel Silverio Da Silva Costa, Girton (GB); Albert Gordon Greenberg, Seattle, WA (US); Parantap Lahiri, Redmond, WA (US); Venkata N. Padmanabhan, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 623 days.

(21) Appl. No.: 11/862,778

(22) Filed: Sep. 27, 2007

(65) Prior Publication Data

US 2009/0089438 A1 Apr. 2, 2009

(51) Int. Cl.
*G06F 15/16* (2006.01)
(52) U.S. Cl.
USPC ........... 709/245; 709/244; 709/238; 709/227; 709/223
(58) Field of Classification Search
USPC ........................................................ 709/245
See application file for complete search history.

(56) References Cited

U.S. PATENT DOCUMENTS

| | | | |
|---|---|---|---|
| 6,131,095 A | 10/2000 | Low et al. | |
| 6,154,777 A * | 11/2000 | Ebrahim | 709/227 |
| 6,256,671 B1 | 7/2001 | Strentzsch et al. | |
| 6,332,158 B1 | 12/2001 | Risley et al. | |
| 6,724,733 B1 | 4/2004 | Schuba et al. | |
| 6,961,783 B1 | 11/2005 | Cook et al. | |
| 7,136,922 B2 | 11/2006 | Sundaram et al. | |
| 7,155,723 B2 | 12/2006 | Swildens et al. | |
| 7,185,052 B2 | 2/2007 | Day | |
| 7,523,170 B1 * | 4/2009 | Allen et al. | 709/217 |
| 2002/0087722 A1 * | 7/2002 | Datta et al. | 709/239 |
| 2002/0177910 A1 * | 11/2002 | Quarterman et al. | 700/28 |
| 2003/0018450 A1 * | 1/2003 | Carley | 702/179 |
| 2004/0073596 A1 | 4/2004 | Kloninger et al. | |
| 2004/0194102 A1 | 9/2004 | Neerdaels | |
| 2004/0249975 A1 | 12/2004 | Tuck et al. | |
| 2004/0264481 A1 | 12/2004 | Darling et al. | |

(Continued)

OTHER PUBLICATIONS

Md. Humayun Kabir. Request-Routing Trends and Techniques in Content Distribution Network. Jul. 3, 2007. http://panda.csc.uvic.ca/papers/storage/RRTrendsCR.pdf.

(Continued)

*Primary Examiner* — Jude Jean Gilles
*Assistant Examiner* — Jaren M Means
(74) *Attorney, Agent, or Firm* — Lee & Hayes, PLLC

(57) ABSTRACT

An intelligent lookup service for a network is provided for clients of a network requesting services of the network that intelligently determines, based on a service requirement of the requested service, optimal service endpoint(s) for providing the requested service. The intelligent lookup service can incorporate predetermined mapping policy and traffic measurements into the determination. In addition, a feedback loop is provided from clients and/or service endpoints to the lookup service concerning measurements about prior connections in the network. The lookup service can include a set of beacons distributed in the network and against which measurements about the network are recorded. A client receives, from the lookup service in response to a request for a network address, a set of candidate service endpoints that pertain to the requested network address and the client connects to one of the candidate service endpoints based on policy or context.

25 Claims, 14 Drawing Sheets

(56) References Cited

U.S. PATENT DOCUMENTS

| | | | |
|---|---|---|---|
| 2005/0033858 A1* | 2/2005 | Swildens et al. | 709/232 |
| 2005/0108071 A1 | 5/2005 | Jain et al. | |
| 2005/0154768 A1 | 7/2005 | Theimer et al. | |
| 2006/0101155 A1 | 5/2006 | Damour et al. | |
| 2006/0233106 A1 | 10/2006 | Achlioptas et al. | |
| 2007/0011685 A1 | 1/2007 | Yim et al. | |
| 2007/0033645 A1* | 2/2007 | Jones | 726/12 |
| 2007/0286384 A1* | 12/2007 | Christensen et al. | 379/201.07 |
| 2007/0294754 A1 | 12/2007 | Finkelstein et al. | |
| 2008/0032705 A1* | 2/2008 | Patel et al. | 455/456.1 |
| 2008/0051094 A1* | 2/2008 | Maki et al. | 455/445 |
| 2008/0209273 A1 | 8/2008 | Bahl et al. | |
| 2008/0320003 A1 | 12/2008 | Heinson et al. | |
| 2009/0086640 A1 | 4/2009 | Zhang et al. | |
| 2009/0086741 A1 | 4/2009 | Zhang et al. | |
| 2009/0222553 A1 | 9/2009 | Qian et al. | |

OTHER PUBLICATIONS

Jeffrey Pang. On the Responsiveness of DNS based Network Control. Oct. 24, 2007. http://www.imconf.net/imc-2004/papers/p21-pang.pdf.

Jussi Kangasharju, et al., "Locating Copies of Objects Using the Domain Name System", Sep. 13, 2007, 14 pages, http://workshop99.ircache.net/Papers/kangasharju-html/index.html.

U.S. Appl. No. 09/714,406, filed Nov. 16, 2000, Bahl, et al., "System Method for Performing Client-Centric Load Balancing of Multiple Globally".

U.S. Appl. No. 12/189,438, filed Aug. 11, 2008, Ahmad, et al., "Distributed Load Balancer".

* cited by examiner

INTELLIGENT NETWORK ADDRESS LOOKUP SERVICE

TECHNICAL FIELD

The subject disclosure relates to an intelligent address lookup service for networked devices for improved delivery of services.

BACKGROUND

By way of background concerning conventional systems, the Domain Name System (DNS) associates addressing and other information with "domain names" for use in connection with the Internet. By analogy, DNS serves as a simple phone book for the Internet that translates human-readable computer hostnames (analogous to names of people), e.g., www.yahoo.com, into the IP addresses (analogous to phone numbers), e.g., 192.210.0.12, that networking equipment needs for delivering information. In providing a worldwide keyword-based directory service, DNS is an engrained component of contemporary Internet use.

There are also other uses of DNS besides translating names to IP addresses. For instance, Mail transfer agents use DNS to find out where to deliver e-mail for a particular address. DNS also stores other information, such as a list of mail exchange servers that accept e-mail for a given domain.

At a higher level, DNS makes it possible to assign Internet destinations to human organizations or concerns they represent, independently of the physical routing hierarchy represented by the numerical IP address. Because of this, hyperlinks and Internet contact information can remain the same, whereas routing arrangements change dynamically, and can take a human-readable form, such as "www.expedia.com", which is easier to remember than an IP address, such as 66.230.200.100. People take advantage of this by using meaningful URLs and e-mail addresses without caring how the machine will actually resolve or locate them.

DNS also distributes the responsibility for assigning domain names and mapping them to IP networks by allowing an authoritative server for each domain to keep track of its own changes, avoiding the need for a central registrar to be continually consulted and updated. Without going into too much detail, the domain name space consists of a tree of domain names. Each node or leaf in the tree has one or more resource records, which hold information associated with the domain name. The tree sub-divides into zones. A zone consists of a collection of connected nodes authoritatively served by an authoritative DNS nameserver.

To provide resilience in the event of computer failure, multiple DNS servers provide coverage of each domain, i.e., multiple servers contain the complete database of domain names and IP addresses. In particular, more than thirteen root servers exist worldwide. DNS programs or operating systems have the IP addresses of these servers built in. All other DNS servers are installed at lower levels of the DNS hierarchy and maintain only certain pieces of the overall database.

The lowest level DNS servers are typically owned by businesses or Internet Service Providers (ISPs). For example, Google maintains various DNS servers around the world that manage the google.com, google.co.uk, and other domains. ISPs also maintain DNS servers to facilitate connecting to the Internet from client desktops, laptops, home networks, portable devices, etc.

DNS networking is thus based on a client/server architecture. When accessing the Internet, a Web browser functions as a DNS client that uses a local DNS resolver, and issues requests to ISP or company DNS servers when navigating Web sites. When the DNS server receives a request for an address not in its database, such as an address for a rarely visited Web site, the local DNS server functions as a DNS client and automatically passes the request to another DNS server, possibly up to the next higher level in the DNS hierarchy, as needed. Eventually the request arrives at a DNS server that has the matching name and IP address in its database, and the response flows back through the chain of DNS servers to the client. In this respect, a request can go all the way to the root level, if necessary.

With DNS, hostnames and IP addresses do not necessarily match on a one-to-one basis. Many hostnames can correspond to a single IP address allowing a single machine to serve many web sites. Alternatively, a single hostname can correspond to many IP addresses. Such flexibility can facilitate fault tolerance and load distribution, and allows a host to seamlessly change its IP address, e.g., due to physical relocation.

The very seamlessness of readdressing a host, however, also leads to a basic problem, which is that DNS is not very smart about its decision-making. For instance, today, if a client's local DNS server is in Ohio where a client engages an ISP, but the client is physically located in Washington, e.g., as part of a business trip, DNS makes routing choices for the client in Washington based on the location of the local DNS server in Ohio. In other words, the designers of DNS originally contemplated computers that remained relatively fixed in position, and near their local DNS server, an assumption that has been significantly challenged with the advent of laptops, portable devices, handheld devices, mobile phones, etc. Thus, as devices move around, they may or may not be near their local DNS server and, as a result, DNS can make some poor choices concerning the path that traffic takes. Thus, DNS is clearly limited in its capabilities and more intelligent path selection is desired for Internet traffic than can be provided by DNS today.

Another basic problem today pertains to delivering services via the Internet, i.e., "cloud services." In this regard, no system today enables mapping of a client to a service access point to meet reliability and performance goals for the client. For instance, as a simple example, suppose a company offers a "real-time" service for information that demands the fastest computational resources available via servers today and suppose a corresponding service is also offered that does not deliver in real-time. For the non real-time service, a request by a client can be satisfied with inexpensive servers with slower processors, etc. Thus, it would be desirable to be able to distinguish between requests from clients that have the real-time service requirements and those that do not so that traffic can be routed to the high end server resources or low end server resources, respectively. Today, there is no way with DNS to achieve such service awareness. DNS traffic routing instead is handled in the same limited way described above. Thus, better ways of mapping network node requests for services are desired.

For the avoidance of doubt, the terms "network service" or "service" are used herein to refer a network service that can be provided to a requesting client, such as but not limited to email services, search services, content services, etc., i.e., by service endpoints in the network. It is also noted that DNS is itself a service, but this does not disturb the general understanding of the term network service as used herein.

Thus, with DNS, any one of many geographically distributed service access points (e.g., server IP addresses) might be returned by DNS (per a DNS lookup request) to handle a service request to a given service, without regard for how to optimize delivery of the service. In this respect, it is left up to DNS to blindly select a candidate. DNS may be configured for round robin assignment among a set of candidate servers, e.g., Yahoo1.com, Yahoo2.com, Yahoo3.com, for example, which might be helpful for load balancing for Yahoo's servers, but does not optimize the choice of candidate unique to the context of a service request.

Accordingly, it would be desirable to provide an improved network address lookup service for intelligent provision of services in a network, such as the Internet. The above-described deficiencies of DNS are merely intended to provide an overview of some of the problems of conventional systems, and are not intended to be exhaustive. Other problems with the state of the art and corresponding benefits of the various non-limiting embodiments of the invention may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments of the invention in a simplified form as a prelude to the more detailed description of the various embodiments of the invention that follows.

An intelligent lookup service for a network is provided for clients of a network requesting services of the network. In one embodiment, the lookup service intelligently determines, based on a service requirement of the requested service, optimal service endpoint(s) for providing the requested service. Mapping information is aggregated in a data store to inform the determination by the lookup service of the optimal service endpoint(s). The lookup service can also optionally incorporate predetermined mapping policy, context information from clients and service endpoint(s), network traffic measurements, or any other information that can help inform the optimal determination of the endpoint(s) for provision of the requested service.

In one non-limiting embodiment, a feedback loop is provided from clients and/or service endpoints to the lookup service about prior connections in the network. In one non-limiting implementation, the lookup service includes a set of distributed beacons in the network against which measurements about the network, e.g., network distance measurements, are recorded. In other embodiments, a client receives, from the lookup service in response to a request for a network address, a set of candidate service endpoints that pertain to the requested network address. The client then chooses one of the candidate service endpoints for connection.

BRIEF DESCRIPTION OF THE DRAWINGS

The lookup service and associated methods of the various non-limiting embodiments provided in accordance with the invention are further described with reference to the accompanying drawings in which.

DETAILED DESCRIPTION

Overview

Figure 1:
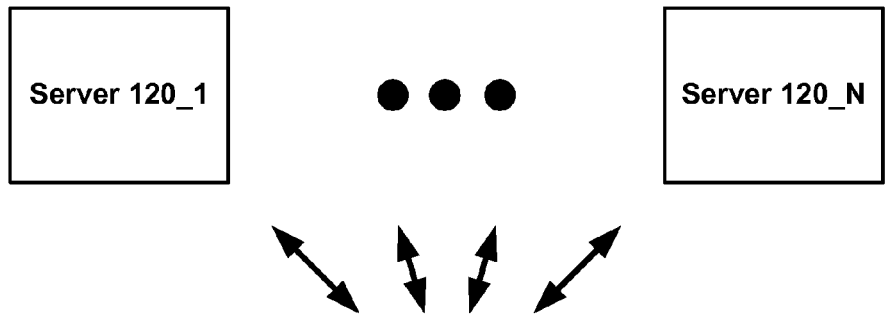
FIG. 1 illustrates a general architecture for a service aware lookup service.
Figure 1:
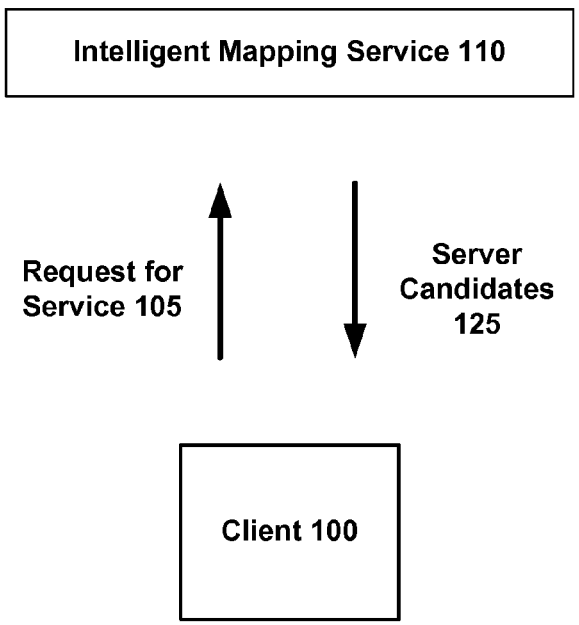

As discussed in the background, among other things, DNS does not include the capability to map clients to candidate service access or end points based on client context, service endpoint context, or based on reliability and performance goals of the clients. Conventional DNS based systems are limited to imperfect attempts to direct clients requesting services to the closest server of a set of candidate servers based on heuristics of the local DNS server providing lookup services for the client.

However, approximating location of the client with heuristics based on the local DNS server, which is independent of client location, results in poor performance where the underlying assumptions of such heuristics are incorrect. In addition, such techniques do little to map service requests to servers based on an awareness of the service to be provided. Moreover, independent of the service being requested, such techniques inherently ignore client context, which can be important to choosing an optimal service access point, instead of focusing only on the local DNS server.

Based in part on consideration of the need for an endpoint context aware and/or service aware lookup service for clients making requests for network resources or services, intelligent mapping services are provided. In one embodiment, a service aware lookup service is provided with which clients can communicate to determine a set of candidates for service access points, or an optimal service access point, for the provision of services to a client from a set of available service access points. For instance, predetermined policy, client context, service endpoint context, network metrics, and/or any other information that is helpful to determine an optimal mapping can be taken into account.

Similar to the use of the term "service" generally, "service aware" as used herein refers to an awareness of characteristic(s) of a requested service of a service endpoint in a network, whereas "lookup service", while a service, refers to a component herein that performs intelligent mapping between such service endpoints and requesting network clients.

In addition to maintaining an awareness of services and having the ability to distinguish among different service requests, the mapping service can also make decisions based on client context and policy. Furthermore, to aid the mapping service in converging on an ideal lookup service based on actual experiences in the network, clients and/or service access points can share the results of their actual communication experiences in the network as well as measurements with respect to common entities, such as known beacons distributed throughout the network.

In this regard, intelligence about the client and about the network "cloud" can be extracted and analyzed. Among other things, this can facilitate "software as a service" technological solutions, by enabling optimal resources to be matched to requests for services. Instead of making guesses based on assumptions as with DNS, the service aware mapping service presents choices to the requesting client based on a variety of information available to the mapping service, i.e., based on intelligence known for a given service request, or based on knowledge that can be inferred.

Service Aware Lookup Services

As mentioned, in various non-limiting embodiments, a service aware mapping service intelligently maps clients to services based on service level requirements for the services, predetermined policy, network measurements, and/or information provided by endpoints in the network. As shown in FIG. 1, in one embodiment, an intelligent mapping service 110 is provided with which clients 100 can communicate to determine a set of candidates for service access points, or an optimal service access point, for the provision of a service to a client from a set of available service access points 120_1 to 120_N for the service. Accordingly, when a client 100 makes a request for a service 105, the mapping service 110 analyzes the service being requested, and based on policy, endpoint context, network measurements, and/or performance requirements for the service, the mapping service 110 determines a set of optimal candidate servers, or an optimal server, 125 for satisfaction of the request 105. For the avoidance of doubt, multiple optimal candidate servers or multiple best, good or satisfactory candidates may exist for a given service request by a client 100.

Figure 2A:
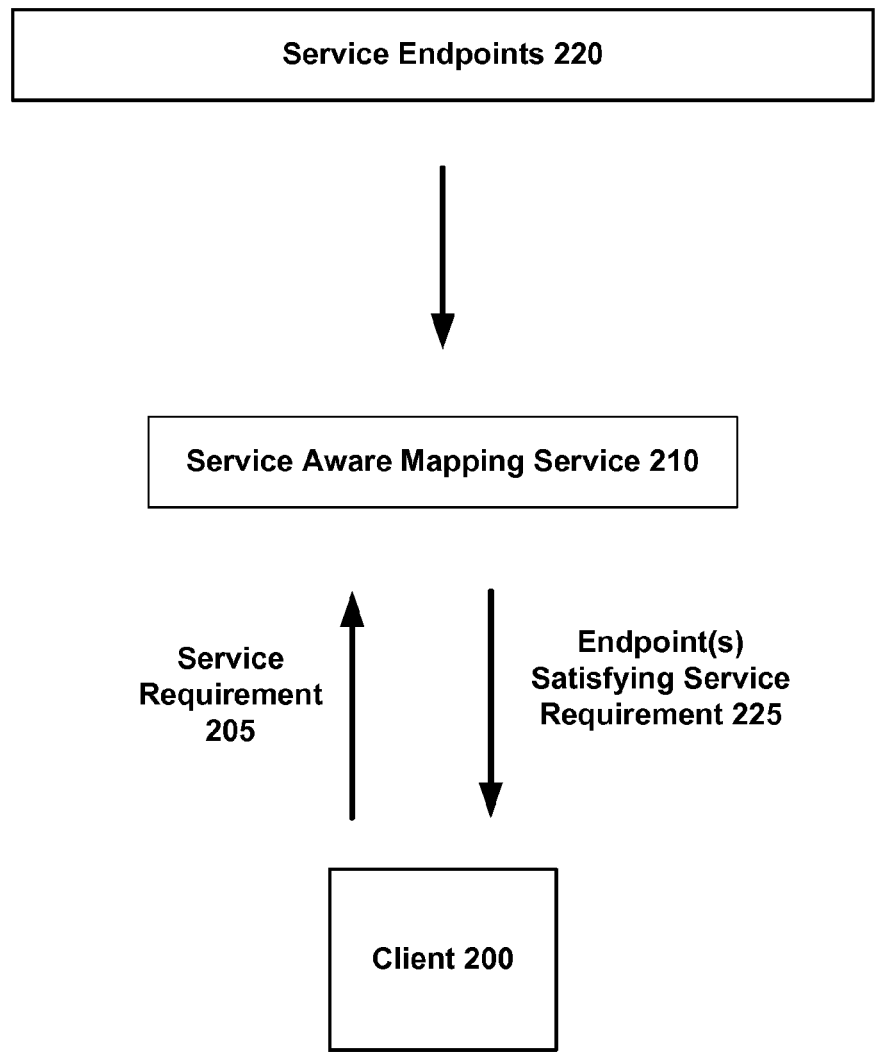
FIGS. 2A and 2B are block diagrams illustrating an embodiment wherein a client chooses from a set of candidate service access points returned by a lookup service.

As illustrated in FIG. 2A, a client 200 may specify, as part of a request for hosts that can provide one or more network services, a service requirement 205, or multiple service requirements. Advantageously, this allows an application or process of client 200 to specify the level of care needed for provision of the service as part of the lookup process with a service aware mapping service 210. Then, based on the service requirement 205 and intelligent mapping information available to the lookup process, identifiers for a set of optimal candidates 225 are transmitted to the client 200 from the universe of identifiers for service endpoints 220.

Representative, but non-limiting, service requirements 205 that may be specified by a client include specifying a service based on a quality of service (QoS) requirement, such as real-time requirements for hi-definition video streaming applications or a cost requirement specified by the client for the requested service where optimization may result in a set of endpoints 225 that are slow, but free. Other non-limiting examples of service requirements 205 include a bandwidth requirement for the requested service or a tolerance level to error rate for the requested service.

Figure 2B:
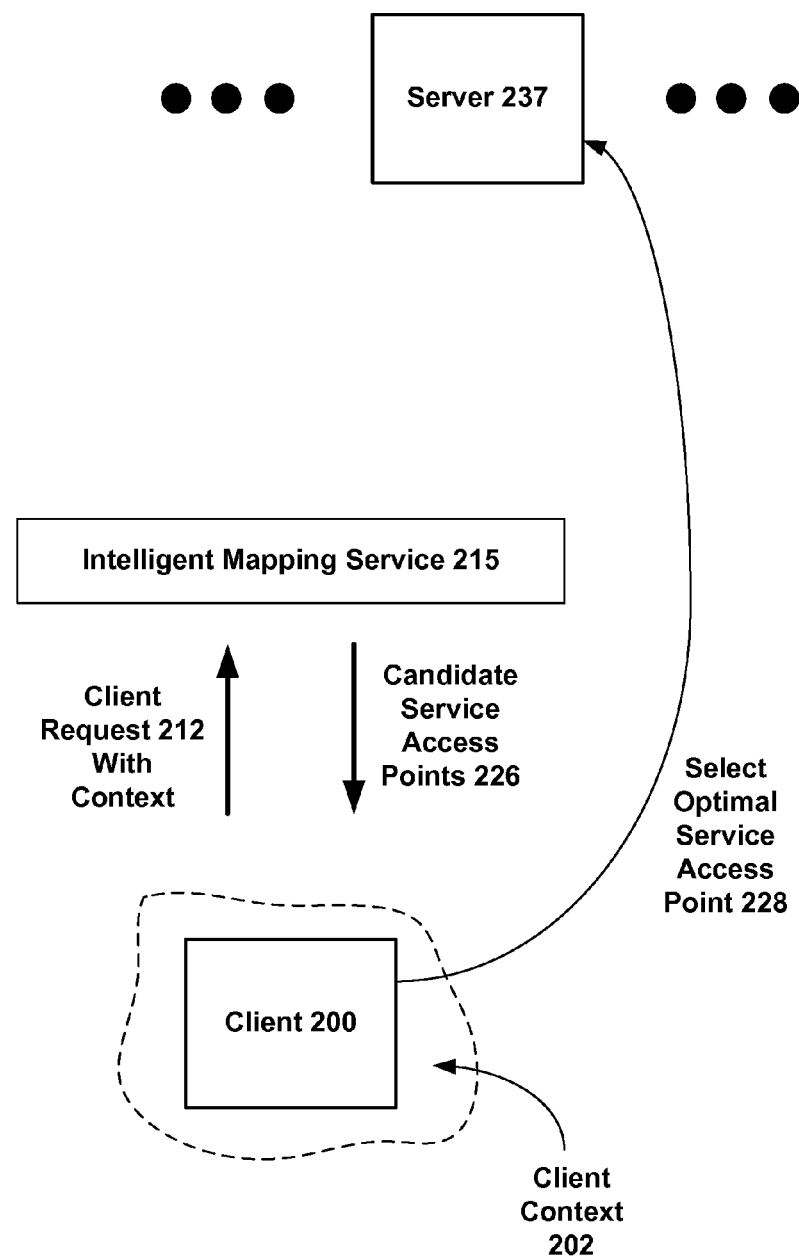

As illustrated in FIG. 2B, in another embodiment of a mapping service 215, client 200 can make a request 212 for a service to the intelligent mapping service 215, e.g., a request for the names of hosts that can best provide the service. The request 212 can include client context 202, so that mapping service 215 in turn can analyze the service being requested in the context 202 of the client 200. As a result, the intelligent mapping service 215 provides a candidate set of service access points 226 in response, which can be a set of service access points that satisfy the request, or a subset of them that are most likely to fulfill the request, or a single endpoint.

At 228, the client in turn can make a decision about which of the candidate service access points 226 the client wishes to engage. As mentioned, this decision can include an analysis of client context 202, and can be explicitly or implicitly specified by a user of the client 200, or automatically decided based on policy and/or client context 202. For instance, in the example shown, client 200 selects server 237 from the candidates 226 to satisfy request 212. In one embodiment, a connection is made to a candidate service access point by default until a more optimal service access point is determined at 228.

Figure 3:
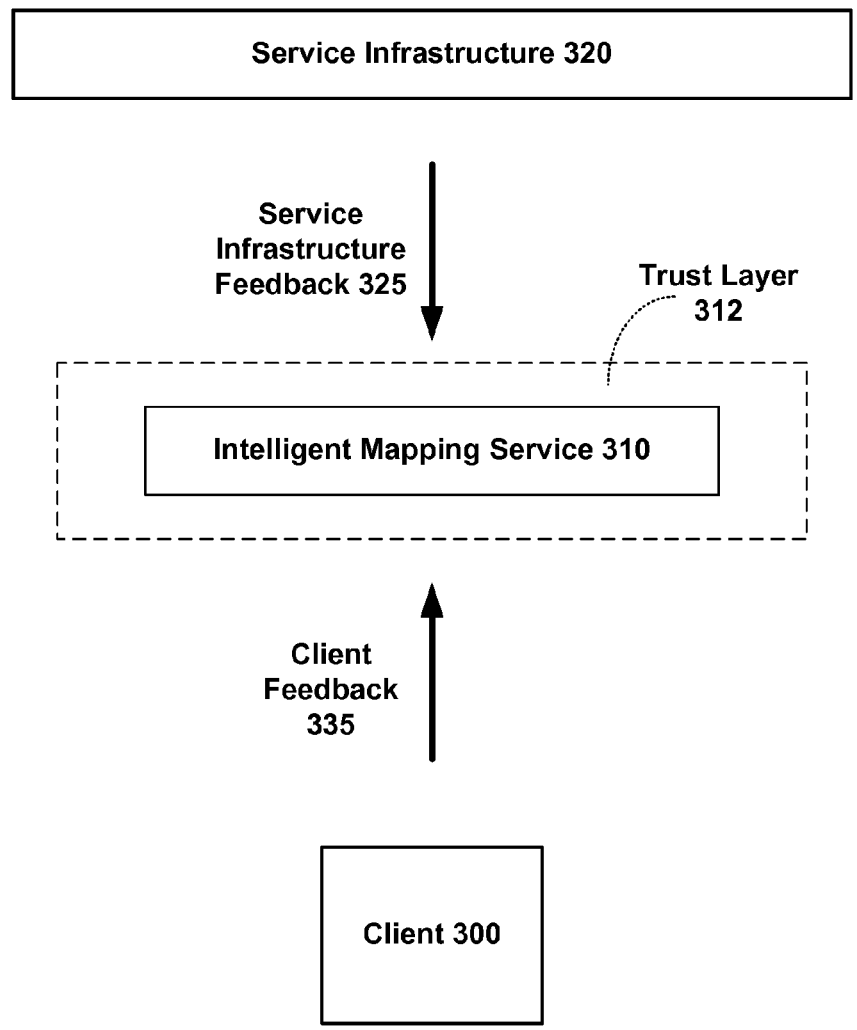
FIG. 3 illustrates the provision of client and/or service infrastructure feedback to a service aware mapping service.

After being presented with a set of candidate service access points by the lookup service for a requested service, and choosing a candidate based on policy and/or client context, the client can cooperate to provide feedback to the lookup service. The provision of feedback is generally illustrated in FIG. 3. Based on actual experience with a service endpoint, client 300 provides client feedback 305 to the mapping service 310 to improve the knowledge on which service 310 predicates its presentation of candidate service points. Feedback 305 can be based on how well a selected service access point has performed for client 300 in the past. In one embodiment, feedback 305 is in the form of measurements recorded by client 300 and provided to the lookup service 310. Feedback 305 can include, for instance, a series of measurements with respect to round trip time communications with a prior endpoint, or whether the performance met the client's requirements for high definition bandwidth. Feedback 305 can also include any other helpful client context that can inform the mapping process how to optimally provide service endpoints to the client, such as client browser cookie objects, calendar objects, or local clock settings. Thus, feedback 305 can be used by the lookup service 310 to improve its mappings based on actual experiences by the clients.

In addition, where entities of the service infrastructure 320, i.e., the infrastructure of various disparate kinds of endpoints in a network that can service client needs for services, are willing to cooperate, service infrastructure feedback 325 can also improve the ecosystem of knowledge possessed by mapping service 310 so that mappings can be made based on the actual quality of service delivered by different service access points. Network infrastructure entities include but are not limited to content delivery networks (CDNs), Explicit Congestion Notification (ECN) data, data centers, etc., any one or more of which can also cooperate with the lookup service 310 to enable better feedback for more intelligent mappings.

For instance, when the maintenance schedule for a server endpoint is made known to the service 310, the service 310 will not map requests to the endpoint when the server endpoint is down or off-line for maintenance. For another example, servers can make their own network performance measurements with respect to client connections as clients connect and disconnect. This explicit feedback 325 from service endpoints to the mapping service 310 about client connections to the servers provides an additional level of information from which mapping service 310 can make intelligent decisions for future client requests for endpoint identifiers for a given service. In another aspect, mapping service 310 can include a trust layer 312 that protects against malicious nodes making inappropriate use of feedback mechanisms or otherwise attempting to disrupt the integrity of the mapping service 310.

Thus, improved lookup methods are provided in various non-limiting embodiments for network interactions among networked devices that can include application of predetermined policy, application of intelligence extracted from the client device, application of intelligence extracted from the service endpoints, or application of intelligence extracted from performance information available in the network.

In various embodiments, any one or more of service-awareness, performance, availability and/or policy can be taken into account when choosing service access point(s), and accordingly, the client request can be optimally mapped to an IP address using the selected service access point(s). The lookup service can make the choice, or the client can make the choice, or the lookup service and the client can divide responsibility for the choice. An optimal choice is particularly important when the communication with the service access point involves several round trips, e.g., authentication, synchronization, login services, etc., or when the service session is long lived, e.g., with hosted e-mail exchange services.

Figure 4:
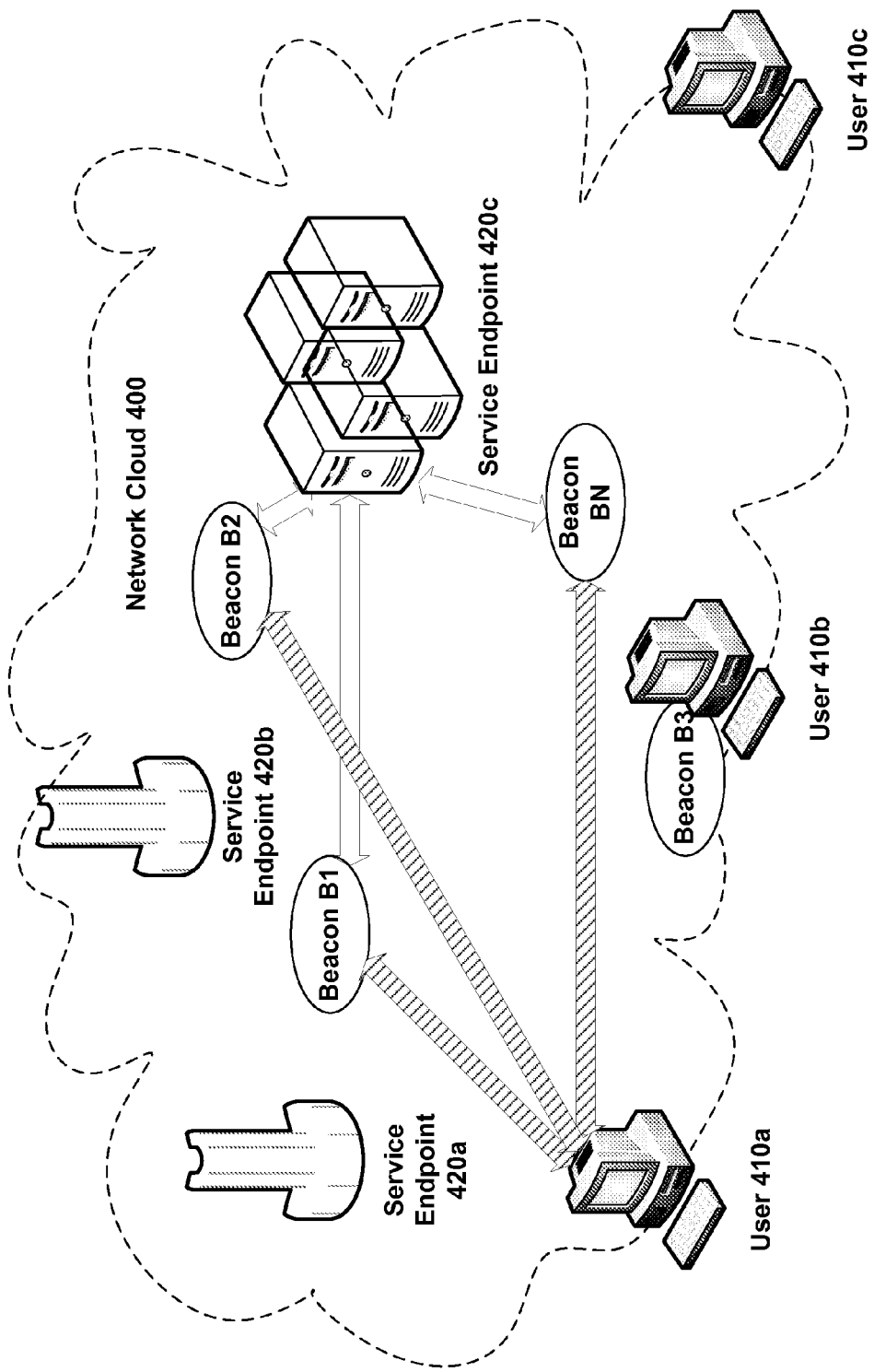
FIG. 4 illustrates an embodiment of the lookup service including a set of geographically distributed beacons.

Accordingly, in one embodiment, as illustrated in FIG. 4, clients 410a, 410b, 410c, and so on, track proximities and other service metrics with respect to a set of beacons B1, B2, B3, . . . , BN, distributed around network cloud 400. In addition, any of the service access points 420a, 420b, 420c, and so on, can also track these metrics with respect to the beacons B1, B2, B3, . . . , BN, and report these metrics back to the clients in response to lookup requests. In one non-limiting embodiment, by logging into the network cloud 400, the client thereby subscribes to data from the beacons B1, B2, B3, . . . , BN. A variety of heuristics can optionally be applied to minimize the impact of any lag resulting from registering.

Figure 5A:
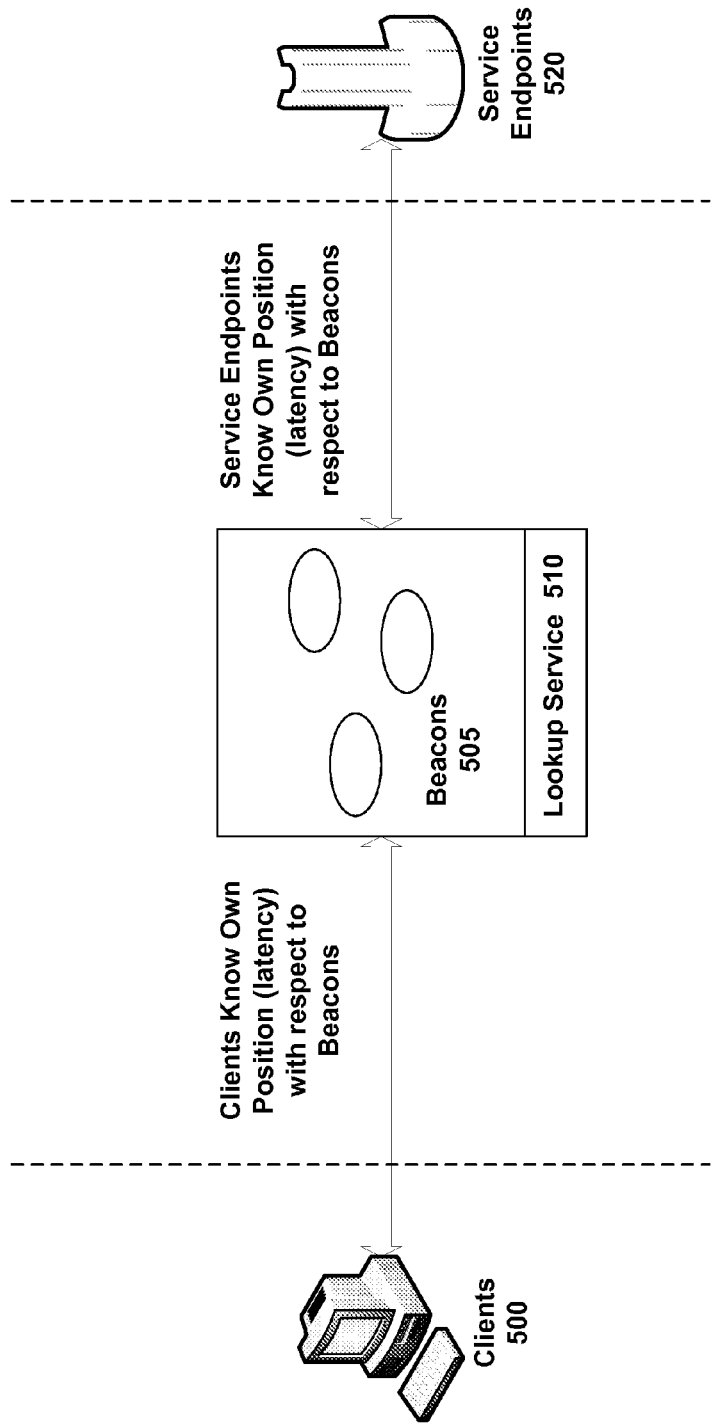
FIG. 5A illustrates cooperation from users and service endpoints in connection with a measurement feedback loop.

As illustrated in FIG. 5A, lookup service 510 is an ecosystem of evolving current information about clients 500 and service endpoints 520 with respect to a set of beacons 505 for which location is known. Clients 500 know their own position, e.g., latency measurements, with respect to beacons 505 and service endpoints 520 know their own position, e.g., latency measurements, with respect to the Beacons. Latency measurements provide a form of relative position of nodes through triangulation techniques. As a result of a collective measurements that can be gathered about relative positioning of nodes across the network, an approximation of the network topology of nodes can be achieved.

In this respect, any machine can serve as a beacon, since any machine knows or can learn its own location in a network topology, and can gather metrics from both clients 500 and endpoints 520 for purposes of facilitating an intelligent match for a request for services. For practical reasons, however, it may be desirable to have a set of anchor beacons, which are stable and provided at fixed locations, since end user machines, and even server connectivity, can come and go. The more reliably a beacon maintains and continues to update its data store of information about provision of services by various service endpoints 520, the more reliable the lookup service 510 will be.

Based on the choices of service access points that are candidates for provision of associated services, the client then makes an informed choice of service access point based on an analysis of metrics between client and beacons and/or metrics between service access points and beacons. This is illustrated generally in the block diagram of FIG. 5B.

Figure 5B:
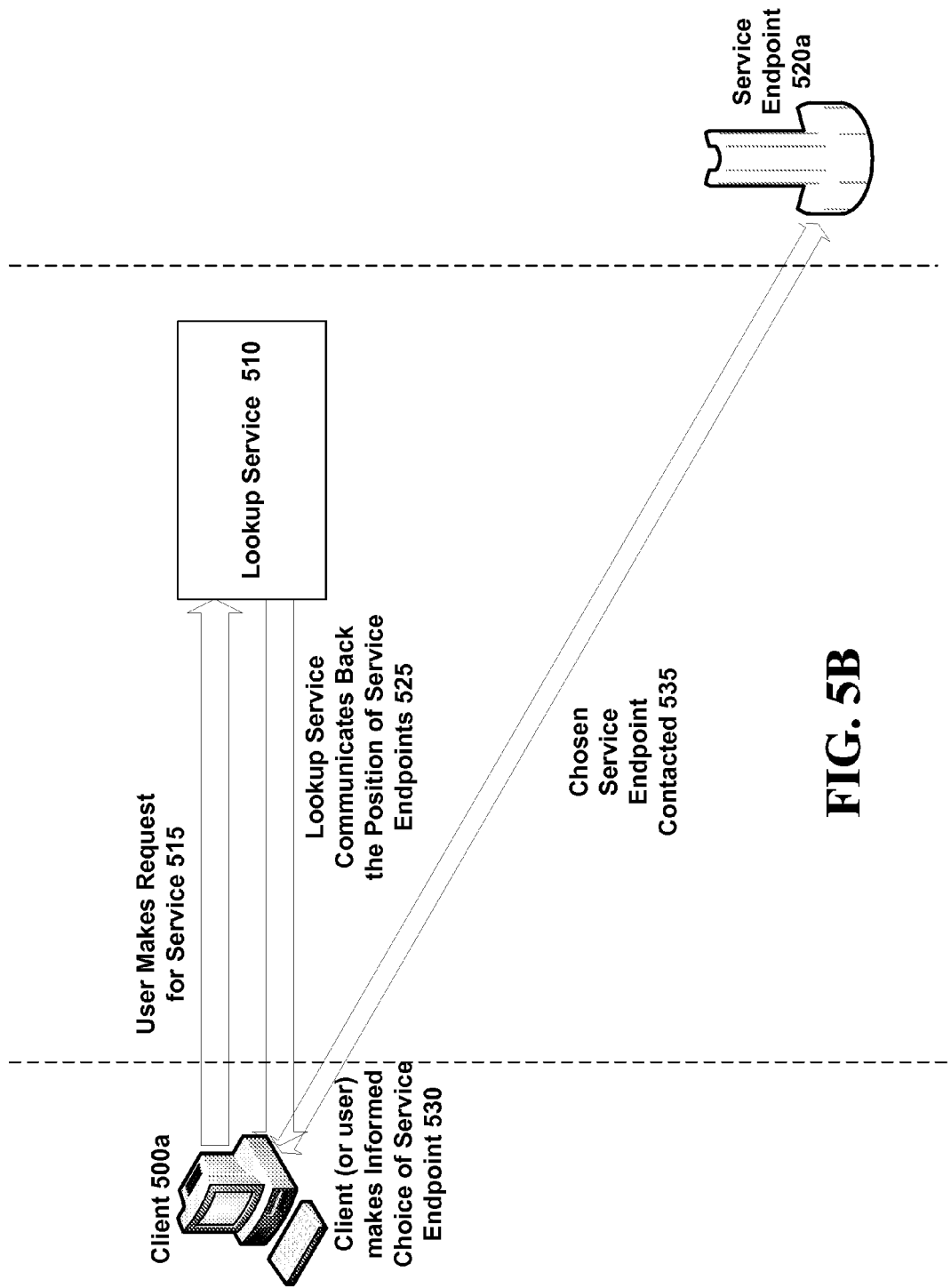
FIG. 5B illustrates the selection of a service endpoint by a client from a set of candidate service endpoints returned from a lookup service.

In this regard, FIG. 5B illustrates the selection of a service endpoint by a client from a set of candidate service endpoints returned from a lookup service. As shown, a client 500a makes a lookup request for service 515, which is received by a lookup service 510. As described elsewhere, the lookup service 510 examines the request, and determines a set of candidate service endpoints to send back to client 500a at 525. At 530, client 500a makes an informed choice of service endpoint 530. Next, at 535, the client is connected to the selected service endpoint 520a.

Policy can be applied at each of the three steps. Information and policy can be enhanced, for example, if a user of a client 500a registers for a service, e.g., logs in to check email or logs in to a personalized web page.

With respect to distance measurements, any measurements that help to optimize delivery of a service by various service endpoints can be used. In an exemplary, non-limiting implementation, coordinate systems are derived from latency measurements to predict internet network distances, though for the avoidance of doubt, this is just one optional implementation. For instance, coordinates-based mechanisms can be used in a peer-to-peer architecture to predict Internet network distance, i.e., round-trip propagation and transmission delay.

A triangulated heuristic, which is based on relative coordinates, is one technique that can be used based on the distances from a host to specialized network nodes. Another mechanism that can be used is Global Network Positioning (GNP), which is based on absolute coordinates computed from modeling the Internet as a geometric space. Since end hosts maintain their own coordinates, these approaches allow end hosts to compute their inter-host distances as soon as they discover each other. Moreover coordinates are very efficient in summarizing inter-host distances, making these approaches very scalable. Thus, using measured Internet distance data, coordinates-based schemes can help inform choices of service access points by clients.

A variety of service load and availability information can also be incorporated into the decision of service access point. In addition, policy, e.g., customer type—higher or lower paying, service level agreement (SLA), content delivery cost, knowledge of maintenance windows, etc. can be incorporated into the decision-making as well. Regarding cost considerations, for example, a response to a request for service can return service access points where the path between client and service involves delivery of content via links to peers as opposed to links to paid transit to third party CDNs or network service providers.

Figure 6:
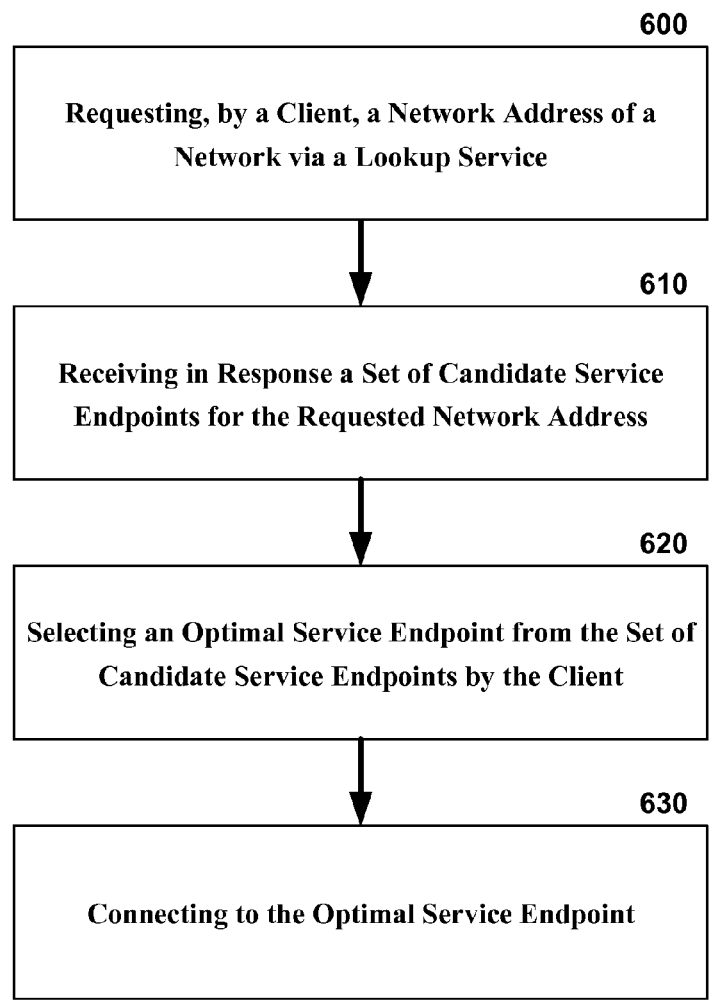
FIG. 6 illustrates an exemplary, non-limiting process implemented by a client interacting with a lookup service.

Unlike conventional systems based on DNS, where DNS makes an uninformed decision, the client can thus perform the mapping decision. This is illustrated generally in the process flow of FIG. 6. For instance, at 600, a client requests a network address of a network or host name via a lookup service. At 610, a set of candidate service endpoints are determined or received by the lookup service and sent to the client. At 620, the client (not the lookup service) selects one of the candidate service endpoints as an optimal endpoint.

As described elsewhere, a host of client context information and information about the candidate service endpoints can inform the decision of which candidate to select by the client. This decision can be made by the lookup service, the client or a combination of the lookup service and the client. Where the client participates in the decision making for the optimal service endpoint(s), the client is provided with some or all of the host of information available to the lookup service. In some instances, a client will have additional information not possessed by the lookup service as part of its local context, which can be used when making the decision. At 630, the client connects to the optimal service endpoint. In one embodiment, while the determination of optimal service endpoint occurs, a default service endpoint can be selected immediately, e.g., based on a past service endpoint that provided the same or similar service satisfactorily. Then, the optimal service endpoint is used only if it satisfies the client's requirements better than the default service endpoint.

Figure 7:
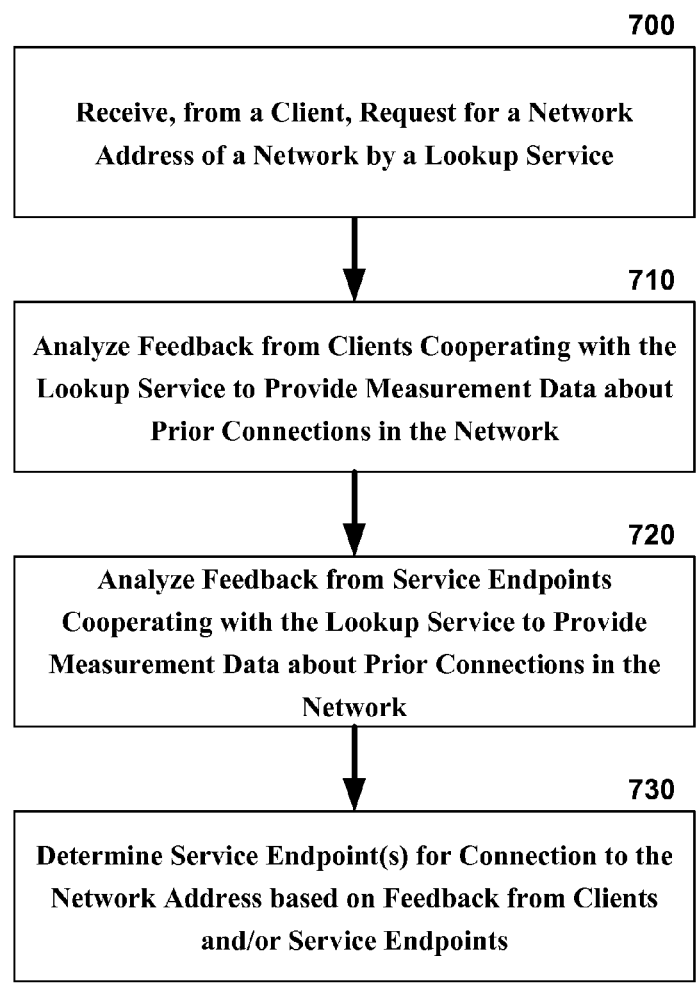
FIG. 7 illustrates an exemplary, non-limiting process implemented by a lookup service interacting with a client.

FIG. 7 illustrates a feedback loop process in accordance with a lookup service. At 700, the lookup service receives a request for a network address of a network. At 710, the lookup service analyzes any feedback that has been received from clients cooperating with the lookup service regarding network measurement data from prior connections to the network. Similarly, at 720, the lookup service analyzes any feedback that has been received from service endpoints cooperating with the lookup service regarding network measurement data from prior connections to the network. At 730, a set of service endpoint(s) are determined that can potentially satisfy the client's request for the network address. As discussed above, the client can then select an optimal service endpoint.

As described above, a set of anchor beacons can be distributed throughout the network. In addition, clients may also organize into a peer to peer (p2p) beacon service, a form of lightweight beacon service in contrast to the anchored beacons. The amount of proving, i.e., potentially n squared, can be mitigated with appropriate security mechanisms to thwart information poisoning. In this regard, more beacons will lead to better results.

Practical Internet Coordinates (PIC) have been proposed for distance estimations between nodes in a network. PIC maps each node to a point in a d-dimensional Euclidean space. When a node n joins the system, it computes the coordinates of its corresponding point. It probes the network distance to each element of a set of landmarks, L, where L must have at least d+1 members. Then it obtains the coordinates of each landmark, and uses a multidimensional global optimization algorithm, e.g., a simplex method for function minimization, to compute its coordinates such that the errors in the |L| predicted distances between n and each node in L are minimized. The errors are computed using the measured and estimated distances. The probe could use Internet Control Message Protocol (ICMP), application-level round-trip time, or number of Internet Protocol (IP) hops. This is similar to GNP described above, except GNP uses a fixed set L for all the nodes that join the system. In PIC, the joining node can pick any node whose coordinates have already been computed to be a landmark.

In this regard, PIC can include a security mechanism as follows. Let N be the set of nodes whose coordinates have already been computed. When a node n joins the system, it can select any set L that is a subset of N with size |L|>d. Three different strategies can be used to choose L: (1) random: pick the elements of L randomly with uniform probability from N, (2) closest: pick the elements of L to be the elements of N closest to n in the network topology and (3) hybrid: pick some elements as in random and others as in closest.

L is defined for a node n to be the union of two sets $L_r$ and $L_c$. The elements in $L_r$ are chosen randomly from N, whilst the elements in $L_c$ are the $|L_c|$ members of N which are closest to node n in the network. When bootstrapping the behavior of the system is slightly different. If |N|<|L|, n selects all the nodes in N. Then it obtains the measured distances between all pairs of nodes in N (a |N|×|N| matrix). In this case, the global optimization algorithm computes new coordinates for all the nodes in N by minimizing the error in the predicted distances between all pairs of nodes in $N \cup \{n\}$.

Figure 8:
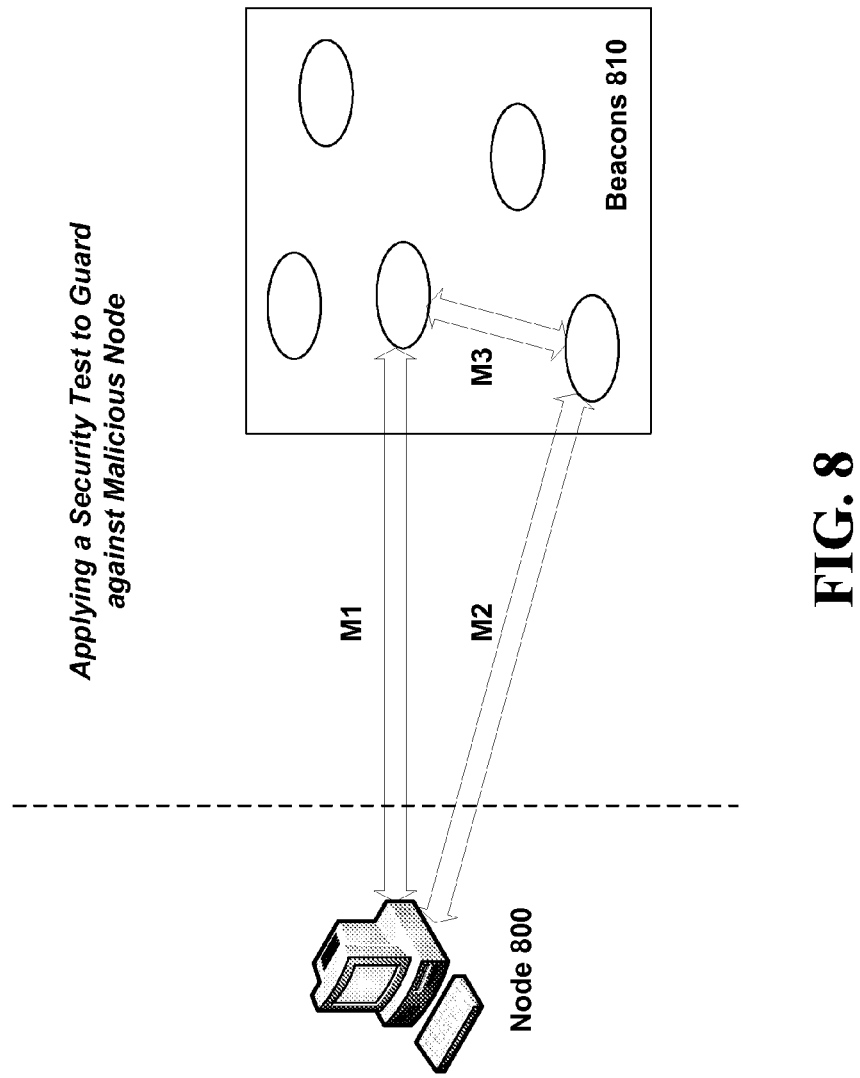
FIG. 8 illustrates application of a security test to guard against measurements received from malicious nodes.

As shown in the block diagram of FIG. 8, a security test can be applied to guard against malicious nodes providing information into beacon network 810 of the lookup service. At a high level, for instance, triangulation can be used as a bound on maliciously provided measurements. For instance, if measurements M1 are provided to only one beacon of beacons 810 from a possibly malicious node 800, it is difficult to tell if the measurements M1 can be trusted. However, once measurements M2 are also made to another beacon of beacons 810, triangulation principles can be used to test whether the measurements M1 and M2 are truthful, since measurements M3 between the associated beacons are known to be truthful. In this regard, the positions of beacons 810 are all known, and thus the measurements M3 act as a check against the legitimacy of measurements M1 and M2.

In more detail, to eliminate malicious nodes from the set of landmarks chosen to compute the coordinates of each node n, a security test can be applied. The test relies on the observation that the triangle inequality holds for most triples of nodes in the Internet. Since the accuracy of PIC and the other distance estimation proposals relies on this condition, it is a reasonable assumption for a security test. Therefore, for most triples of nodes a, b, c, $d_{a,b}+d_{b,c} \geq d_{a,c}$, where $d_{i,j}$ denotes either the measured network distance between i and j or the predicted distance.

The intuition behind the security test is as follows. An attacker that lies about its coordinates or its distance to the joining node is likely to violate triangle inequality. The joining node uses the distances it measured to each landmark node and the coordinates of the landmarks to check for violations of the triangle inequality. It then removes from L the nodes that most violate the triangle inequality.

Such a security test scales well because it does not rely on infrastructure nodes; any node whose coordinates have already been computed can act as a landmark. Therefore, communication and computation load can be distributed evenly over all the nodes in a system. Additionally, coordinates are computed efficiently and landmark nodes are selected in a way that predicts distances as accurately as GNP. Finally, PIC can compute accurate coordinates even when some peers are malicious.

Figure 9A:
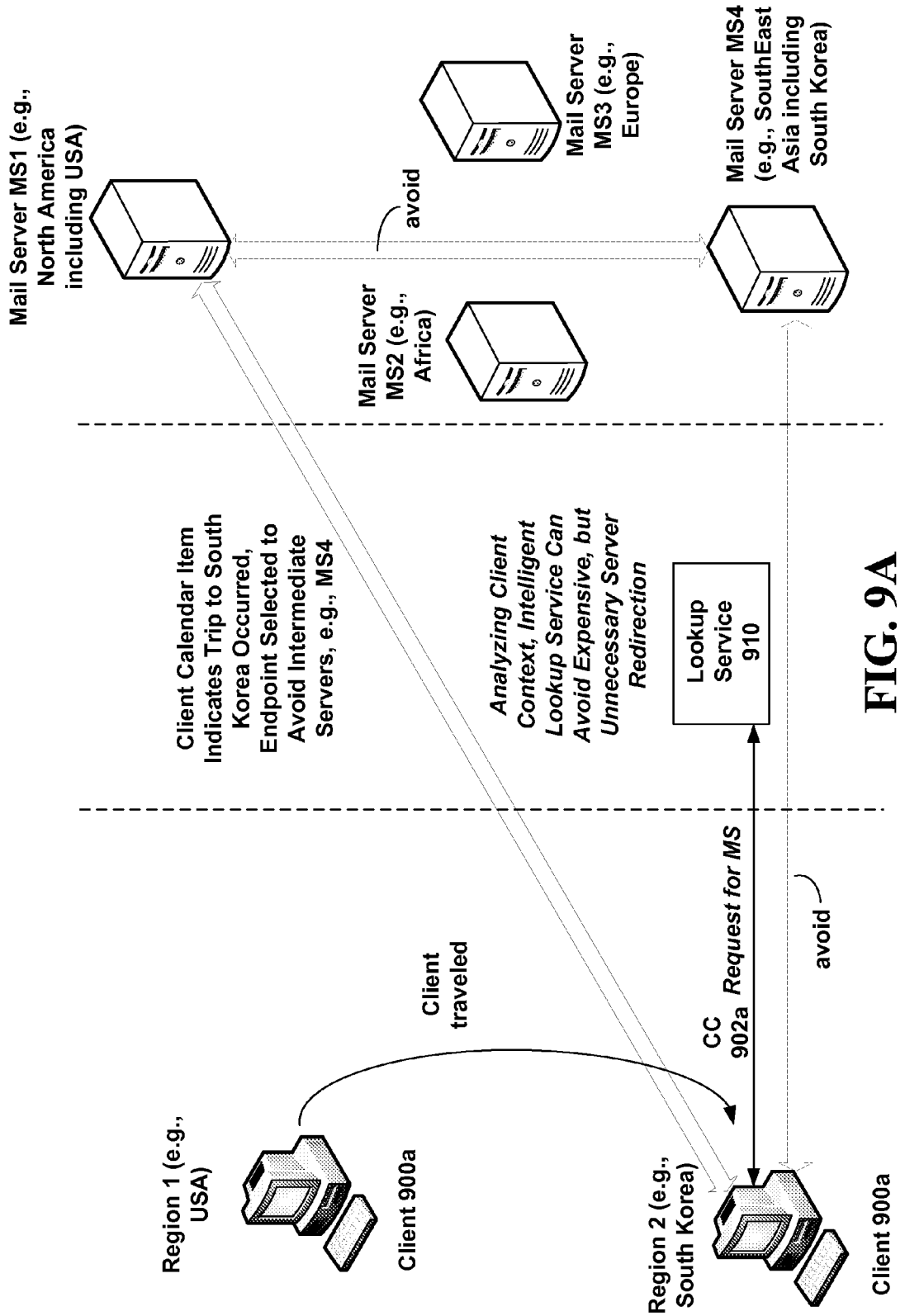
FIGS. 9A and 9B illustrate exemplary, non-limiting scenarios that show the power of network service endpoint utilization based on client context.
Figure 9B:
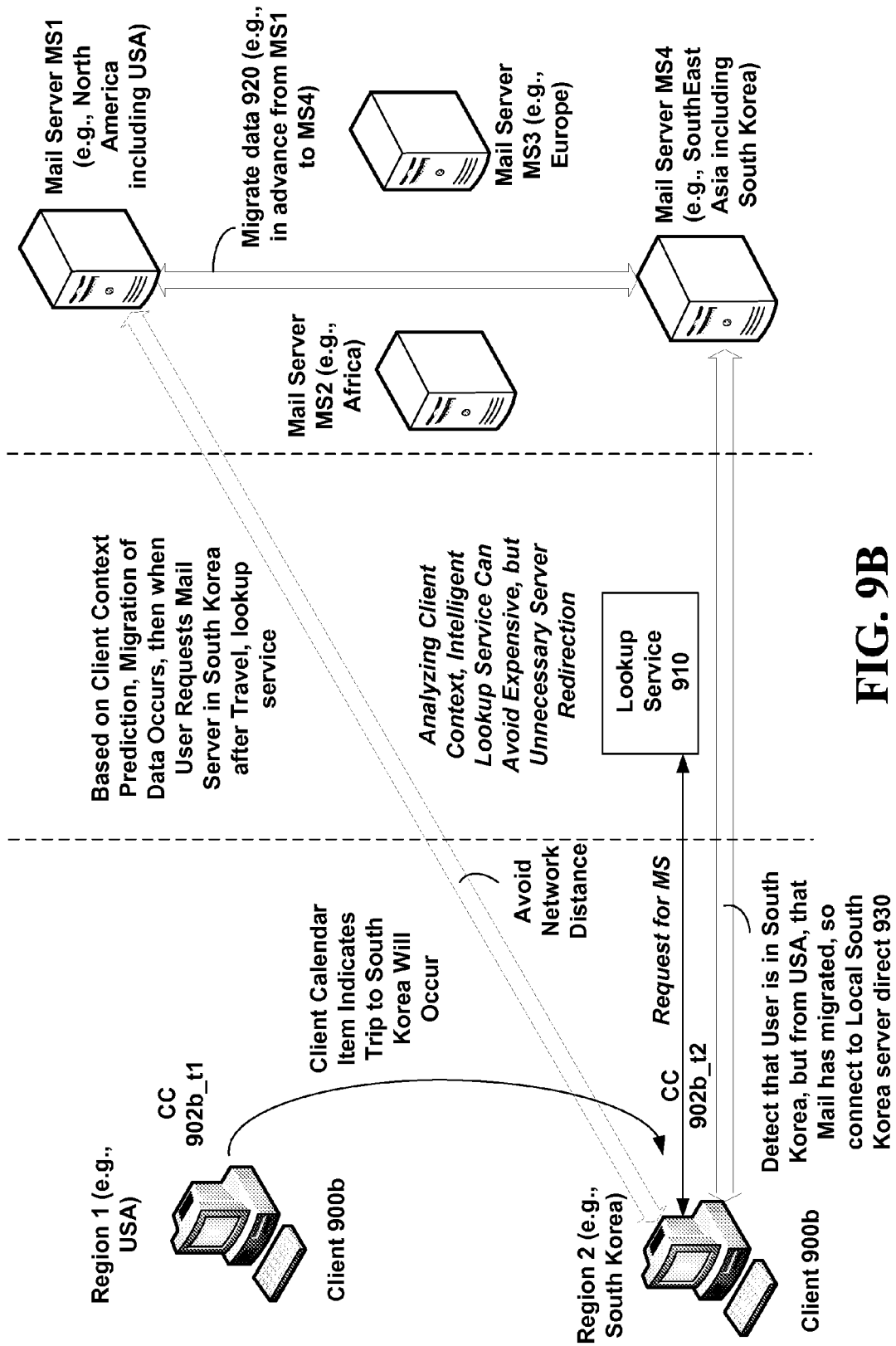

Accordingly, various embodiments for an intelligent lookup service are described herein that performs intelligent mapping based on information available about clients, network measurements and service endpoints. FIGS. 9A and 9B illustrate some example scenarios of using the lookup service. FIG. 9A depicts a block diagram of client 900*a* located in Region 1, in this case, the United States. As mentioned in the background, a significant problem with DNS today is that it does not make an intelligent determination of optimal servers for use. For instance, with DNS, when client 900*a* goes to Region 2, e.g., South Korea, DNS will continue to direct client 900*a* to mail server MS1 located in North America, but through South Korea server MS4, which can introduce significant lags and delays in retrieval and sending of data from and to the mail server MS1.

For instance, a mail server MS for a company may comprise globally situatied mail servers MS1, MS2, MS3 and MS4. Today, when a company employee from the United States travels to South Korea with his or her laptop, and then performs a DNS lookup for his or her company's mail server MS, the South Korea server MS4 does not have the user's mail information readily available. As a result, through the DNS protocol described in the background, the South Korea server must communicate with the US server MS1 on the user's behalf, introducing lag and delay from too many servers MS1 and MS4 communicating on behalf of the user for a simple mail request.

With various embodiments described herein, however, client context 902*a* can inform the lookup service 910 to make an intelligent mapping to a more appropriate mail server for the request for MS. For instance, client context 902*a* might include a client calendar item that indicates the user traveled to South Korea two days ago for a one week trip. Or, client context 902a may include a local clock time that indicates a South Korea time zone in which the user is present. Accordingly, based on an intelligent policy implemented by lookup service 910, client 900a can convey client context 902a to the lookup service 910, which determines based on the client context 902a that the user is from USA, and so instead of redirecting through South Korea mail server MS4 as with DNS, the intelligent lookup service 910 sends the client 900a directly to the USA server MS1. As a result, this avoids the South Korea server MS4 as an intermediary, thereby reducing network delays and overhead.

As another example shown in FIG. 9B, service 910 service is able to determine from the user's calendar represented in client context 902b_t1 (at a first time) that the user, e.g., owner of client 900b, will be traveling to South Korea soon. In such case, all or a portion of the user's mail can be migrated or copied to the South Korea server MS4 at the first time. Then, after the user of client 900b has traveled, at t2 (a second time) and the user performs a lookup request for mail server MS including client context 902b_t2, the analysis of intelligent mapping service 910 will determine (a) that the user is from the USA and (b) that the mail has already been migrated. As a result, instead of communicating with the North America server MS1, the lookup service 910 directs client 900b to the local South Korea server, and user will have fast experience. Thus, intelligence about the mapping process can come from a variety of sources for endpoint context, i.e., any piece of information available that can inform the process of selecting an optimal endpoint.

The network interaction and utilization becomes more efficient for the user 900 in a seamless fashion. When the network interactions for each client are made more efficient due to the intelligent mapping services provided in accordance with the invention, the whole network benefits since in effect, reducing inefficient transactions in the network by providing faster, shorter, etc. connections, increases overall bandwidth for additional clients.

In this regard, as described in various non-limiting embodiments above, the systems and methods of the invention extract and analyze intelligence on the client and in the network "cloud." Among other things, the invention thus facilitates "software as a service" business models and technological solutions.

Exemplary Networked and Distributed Environments

One of ordinary skill in the art can appreciate that the invention can be implemented in connection with any computer or other client or server device, which can be deployed as part of a computer network, or in a distributed computing environment, connected to any kind of data store. In this regard, the present invention pertains to any computer system or environment having any number of memory or storage units, and any number of applications and processes occurring across any number of storage units or volumes, which may be used in connection with lookup services provided in accordance with the present invention. The present invention may apply to an environment with server computers and client computers deployed in a network environment or a distributed computing environment, having remote or local storage.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may request the lookup services of the invention.

Figure 10:
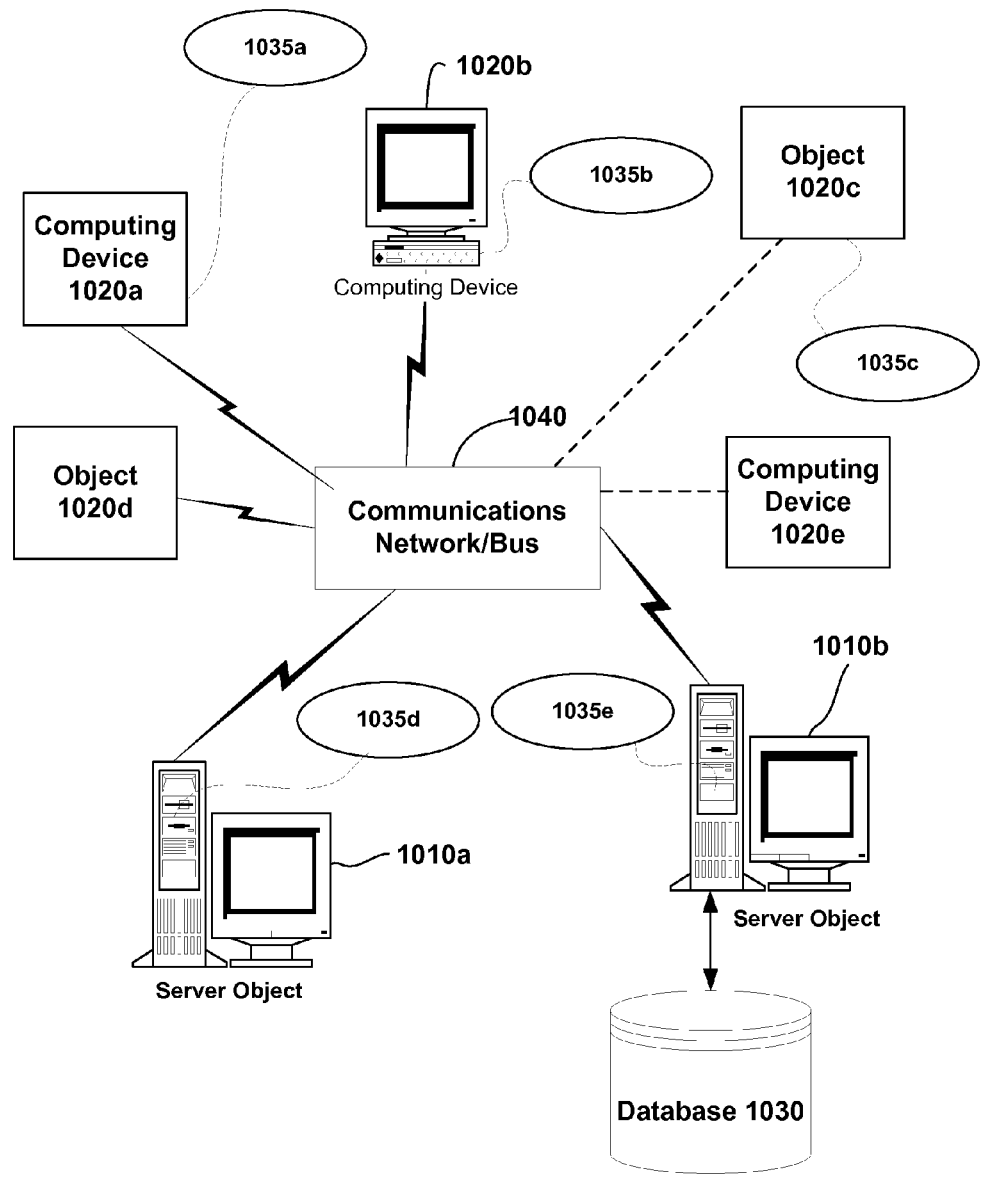
FIG. 10 is a block diagram representing an exemplary non-limiting networked environment in which the present invention may be implemented.

FIG. 10 provides a schematic diagram of an exemplary networked or distributed computing environment. The distributed computing environment comprises computing objects 1010a, 1010b, etc. and computing objects or devices 1020a, 1020b, 1020c, 1020d, 1020e, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 1040. This network may itself comprise other computing objects and computing devices that provide services to the system of FIG. 10, and may itself represent multiple interconnected networks. In accordance with an aspect of the invention, each object 1010a, 1010b, etc. or 1020a, 1020b, 1020c, 1020d, 1020e, etc. may contain an application that might make use of an API, or other object, software, firmware and/or hardware, suitable for communication with lookup services provided in accordance with the invention.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to the lookup services of the present invention.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 10, as an example, computers 1020a, 1020b, 1020c, 1020d, 1020e, etc. can be thought of as clients and computers 1010a, 1010b, etc. can be thought of as servers where servers 1010a, 1010b, etc. maintain the data that is then replicated to client computers 1020a, 1020b, 1020c, 1020d, 1020e, etc., although any computer can be considered a client, a server, or both, depending on the circumstances. Any of these computing devices may be processing data, recording measurements or requesting services or tasks that may implicate the lookup services in accordance with the invention.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for performing intelligent mappings to network address of the invention may be distributed across multiple computing devices or objects.

In a network environment in which the communications network/bus 1040 is the Internet, for example, the servers 1010a, 1010b, etc. can be Web servers with which the clients 1020a, 1020b, 1020c, 1020d, 1020e, etc. communicate via any of a number of known protocols such as HTTP. Servers 1010a, 1010b, etc. may also serve as clients 1020a, 1020b, 1020c, 1020d, 1020e, etc., as may be characteristic of a distributed computing environment.

EXEMPLARY COMPUTING DEVICE

Figure 11:
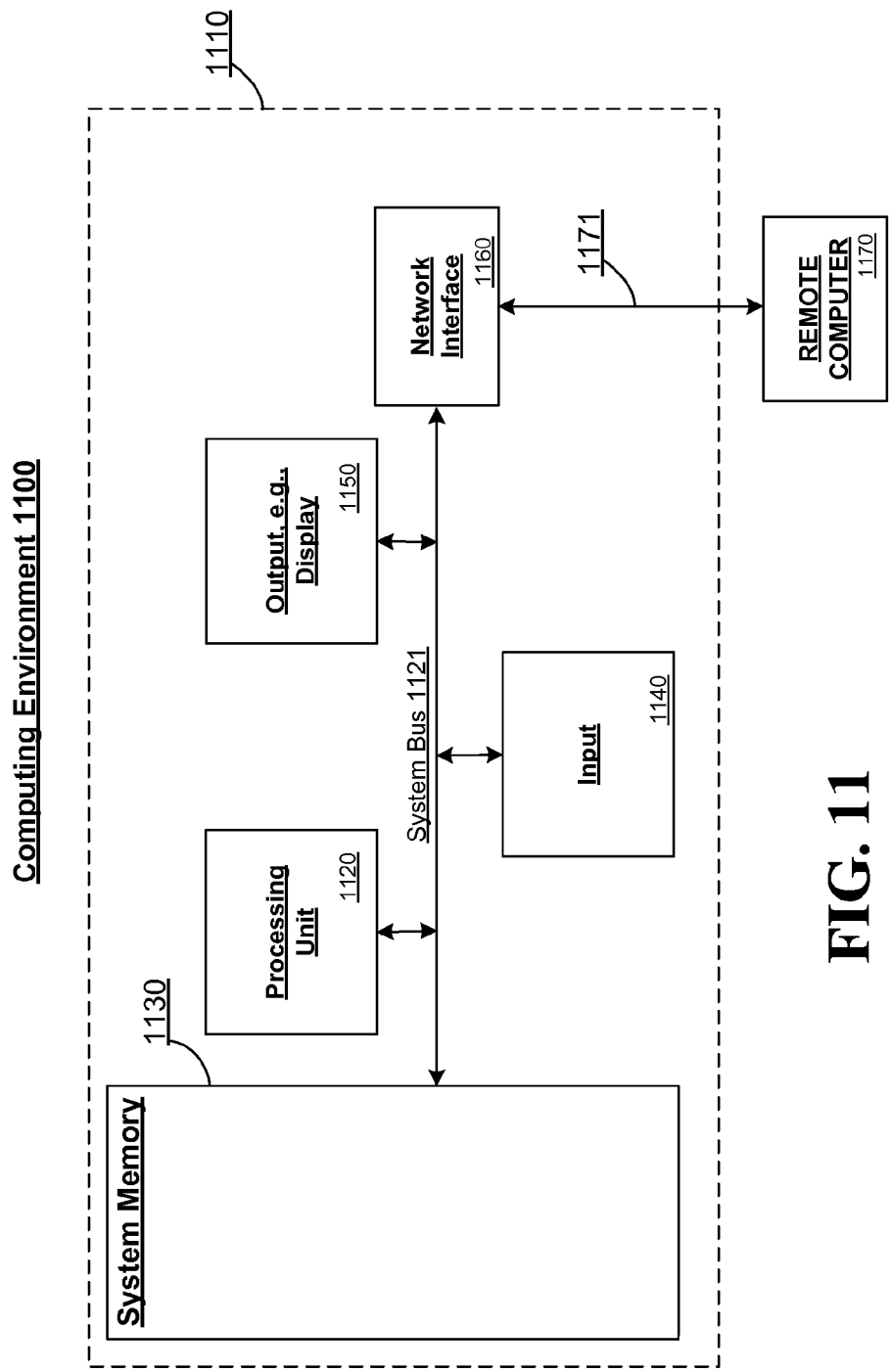
FIG. 11 is a block diagram representing an exemplary non-limiting computing system or operating environment in which aspects of the present invention may be implemented.

As mentioned, the invention applies to any device wherein it may be desirable to request network services. It should be understood, therefore, that handheld, portable and other computing devices and computing objects of all kinds are contemplated for use in connection with the present invention, i.e., anywhere that a device may request lookup services for a network address in a network. Accordingly, the below general purpose remote computer described below in FIG. 11 is but one example, and the present invention may be implemented with any client having network/bus interoperability and interaction. Additionally, service endpoints and/or beacon nodes can include one or more aspects of the below general purpose computer.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 11 thus illustrates an example of a suitable computing system environment 1100 in which the invention may be implemented, although as made clear above, the computing system environment 1100a is only one example of a suitable computing environment and is not intended to suggest any limitation as to the scope of use or functionality of the invention. Neither should the computing environment 1100 be interpreted as having any dependency or requirement relating to any one or combination of components illustrated in the exemplary operating environment 1100.

With reference to FIG. 11, an exemplary remote device for implementing the invention includes a general purpose computing device in the form of a computer 1110. Components of computer 1110 may include, but are not limited to, a processing unit 1120, a system memory 1130, and a system bus 1121 that couples various system components including the system memory to the processing unit 1120.

Computer 1110a typically includes a variety of computer readable media and can be any available media that can be accessed by computer 1110a. The system memory 1130 may include computer storage media in the form of volatile and/or nonvolatile memory such as read only memory (ROM) and/or random access memory (RAM). By way of example, and not limitation, memory 1130 may also include an operating system, application programs, other program modules, and program data.

A user may enter commands and information into the computer 1110 through input devices 1140 A monitor or other type of display device is also connected to the system bus 1121 via an interface, such as output interface 1150. In addition to a monitor, computers may also include other peripheral output devices such as speakers and a printer, which may be connected through output interface 1150.

The computer 1110 may operate in a networked or distributed environment using logical connections to one or more other remote computers, such as remote computer 1170. The remote computer 1170a may be a personal computer, a server, a router, a network PC, a peer device or other common network node, or any other remote media consumption or transmission device, and may include any or all of the elements described above relative to the computer 1110. The logical connections depicted in FIG. 11 include a network 1171, such local area network (LAN) or a wide area network (WAN), but may also include other networks/buses. Such networking environments are commonplace in homes, offices, enterprise-wide computer networks, intranets and the Internet.

As mentioned above, while exemplary embodiments of the present invention have been described in connection with various computing devices and network architectures, the underlying concepts may be applied to any network system and any computing device or system in which it is desirable to request network services.

There are multiple ways of implementing the present invention, e.g., an appropriate API, tool kit, driver code, operating system, control, standalone or downloadable software object, etc. which enables applications and services to use the lookup services of the invention. The invention contemplates the use of the invention from the standpoint of an API (or other software object), as well as from a software or hardware object that provides lookup services in accordance with the invention. Thus, various implementations of the invention described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While the present invention has been described in connection with the preferred embodiments of the various figures, it is to be understood that other similar embodiments may be used or modifications and additions may be made to the described embodiment for performing the same function of the present invention without deviating therefrom. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A service-aware lookup service for a network of computing nodes, comprising:
   a lookup service that
      receives a request from a client of the network for a service provided by a plurality of service endpoints of the network, wherein the request comprises client context information associated with at least one client application,
      in response to the client request for the service, determines an optimal service endpoint and at least one alternative service endpoint for providing the service requested by the client, wherein the lookup service determines the optimal service endpoint based at least in part on the client context information associated with at least one client application, and
      concurrently notifies the client of both the optimal service endpoint and the at least one alternative service endpoint, to enable the client to select between the optimal service endpoint and the at least one alternative service endpoint; and
   at least one data store storing mapping information about the optimal service endpoint, wherein the lookup service determines the optimal service endpoint based at least in part on the mapping information stored in the at least one data store.

2. The service-aware lookup service of claim 1, wherein the request further comprises service level requirement information associated with a quality of service (QoS) requirement specified by the client for the requested service.

3. The service-aware lookup service of claim 1, wherein the request further comprises service level requirement information associated with a cost requirement specified by the client for the requested service.

4. The service-aware lookup service of claim 1, wherein the request further comprises service level requirement information associated with a bandwidth requirement specified by the client for the requested service.

5. The service-aware lookup service of claim 1, wherein the request further comprises service level requirement information associated with a tolerance level for an error rate specified by the client for the requested service.

6. The service-aware lookup service of claim 1, wherein the lookup service further determines the optimal service endpoint based on at least one predetermined policy for mapping the requested service.

7. The service-aware lookup service of claim 1, wherein the lookup service further determines the optimal service endpoint based on at least one measurement of network traffic.

8. The service-aware lookup service of claim 7, wherein the at least one measurement of network traffic is measured by the client within the network.

9. The service-aware lookup service of claim 7, wherein the at least one measurement of network traffic is measured by at least one service endpoint of the plurality of service endpoints within the network.

10. The service-aware lookup service of claim 1, wherein the lookup service further comprises a set of beacons distributed within the network at known network locations, and wherein the lookup service further
    determines a network location of at least one service endpoint of the plurality of service endpoints via triangulation that is based on the known network locations of the set of distributed beacons and transmission latencies between the set of distributed beacons and the at least one service endpoint, and
    determines a network location of the client via triangulation that is based on the known network locations of the set of distributed beacons and transmission latencies between the set of distributed beacons and the client.

11. The service-aware lookup service of claim 10, wherein the set of distributed beacons comprises one or more anchor beacons, wherein each anchor beacon of the one or more anchor beacons has a stable and unchanging network connection.

12. The service-aware lookup service of claim 10, wherein the set of distributed beacons comprises one or more lightweight beacons, wherein each lightweight beacon of the one or more lightweight beacons has an unstable network connection and is configured to make one or more network measurements when connected to the network.

13. A method comprising:
    requesting, at a client computing device, a network service having a network address, via a lookup service in a network, wherein the request comprises client context information associated with at least one client application;
    concurrently receiving from the lookup service, at the client computing device, in response to the request, an indication of two or more candidate service endpoints associated with the network address of the requested network service, wherein each candidate service endpoint of the two or more candidate service endpoints is identified by the lookup service based at least in part on the client context information associated with the at least one client application; and determining, by the client computing device, an optimal service endpoint of the two or more candidate service endpoints.

14. The method of claim 13, further comprising connecting the client computing device to the optimal service endpoint.

15. The method of claim 13, further comprising:
prior to the determining the optimal service endpoint, connecting the client computing device to a default service endpoint; and
switching the connection of the client computing device from the default service endpoint to the optimal service endpoint in response to detecting one or more network conditions.

16. A method comprising:
receiving, at a lookup service of a network, a request from a client computing device for a network service having a network address;
based on feedback received from one or more client computing devices about prior connections with one or more service endpoints of the network, determining, by the lookup service, an optimal service endpoint and at least one alternative service endpoint relating to the network address of the requested network service, wherein the feedback comprises one or more measurements taken by the client computing device within the network; and
concurrently notifying the client computing device of both the optimal service endpoint and the at least one alternative service endpoint.

17. The method of claim 16, further comprising connecting the client computing device to the optimal service endpoint or the at least one alternative service endpoint.

18. The method of claim 16, further comprising analyzing the feedback received from the one or more client computing devices or a feedback received from one or more service endpoints of the network, to determine whether the received feedback is trusted feedback or an untrusted feedback.

19. The method of claim 16, wherein the lookup service further determines the optimal service endpoint based at least in part on distance measurements indicating a distance between the client computing and one or more anchor beacons or a distance between the optimal service endpoint and the one or more anchor beacons, wherein the one or more anchor beacons are strategically distributed throughout the network.

20. A method comprising:
receiving, at a lookup service of a network, a request for a network service from a client computing device, the request including client context information and a location of the client computing device within the network, wherein the location of the client computing device is determined based at least in part on known network locations of a plurality of network beacons and based at least in part on transmission latencies between the client computing device and at least one network beacon of the plurality of network beacons;
determining, by the lookup service, an optimal service endpoint and at least one alternative service endpoint for providing the network service requested by the client computing device based at least in part on the location of the client computing device and the client context information; and
concurrently notifying, by the lookup service, the client computing device of both the optimal service endpoint and the at least one alternative service endpoint.

21. The service-aware lookup service of claim 1, wherein the at least one client application is a calendar application, and the client context information is a calendar item associated with a client travel itinerary.

22. The service-aware lookup service of claim 1, wherein the at least one client application is a web browser application, and the client context information is a client browser cookie object.

23. The method of claim 13, wherein the at least one application is a calendar application, and the client context information is a calendar item associated with a client travel itinerary.

24. The method of claim 13, wherein the at least one application is a web browser application, and the client context information is a client browser cookie object.

25. The method of claim 20, wherein the client context information is a calendar application item associated with a client travel itinerary.

* * * * *